United States Patent [19]

Jackson, Jr.

[11] 4,293,785

[45] Oct. 6, 1981

[54] ROTATING ELECTRIC MACHINES WITH ENHANCED RADIATION COOLING

[75] Inventor: John T. Jackson, Jr., St. Paul, Oreg.

[73] Assignee: Jackson Research, Inc., St. Paul, Oreg.

[21] Appl. No.: 80,452

[22] Filed: Oct. 1, 1979

Related U.S. Application Data

[63] Continuation-in-part of Ser. No. 939,804, Sep. 5, 1978, abandoned.

[51] Int. Cl.³ .................. H02K 9/00; F28F 27/00; B05D 5/12
[52] U.S. Cl. ............................. 310/64; 310/45; 165/96; 165/133; 427/104; 427/160; 428/207; 428/212; 428/409; 428/542

[58] Field of Search .............. 310/45, 52, 64, 272, 310/273; 427/104, 160; 428/212, 409, 206, 207, 208, 542; 165/96, 133

[56] References Cited

U.S. PATENT DOCUMENTS

| | | | |
|---|---|---|---|
| 3,154,139 | 10/1964 | Hager, Jr. | 165/133 |
| 3,247,004 | 4/1966 | Dosser | 427/104 |
| 3,671,286 | 6/1972 | Fischell | 427/160 |
| 3,749,950 | 7/1973 | Lenz | 310/45 |
| 4,113,518 | 9/1978 | Henderson | 310/45 |
| 4,134,451 | 1/1979 | Conant et al. | 165/133 |

*Primary Examiner*—William R. Dixon, Jr.
*Attorney, Agent, or Firm*—Chernoff & Vilhauer

[57] ABSTRACT

A rotating electric machine with a cylindrical rotor and a cylindrical stator enclosing the rotor is provided with coatings on the outer surface of the rotor and the inner surface of the stator for the enhancement of radiative heat exchange between these components.

6 Claims, 6 Drawing Figures

ROTATING ELECTRIC MACHINES WITH ENHANCED RADIATION COOLING

CROSS-REFERENCE TO OTHER APPLICATIONS.

This application is a continuation-in-part of my copending application Ser. No. 939,804, filed Sept. 5, 1978, now abandoned.

BACKGROUND OF THE INVENTION

The invention relates to rotating electric machinery; it relates more particularly to electric motors and generators in which radiative heat exchange between the opposite surfaces of the stator and rotor assemblies is enhanced by means of surface coatings.

The designers of rotating electric machinery have been traditionally aware of the substantial role that heat dissipation plays in the operation of electric motors and generators since the permissible temperature rise of the materials utilized to insulate the conductors in these components sets a practical limit to the reduction in size and improvement in efficiency of their products. In particular, the dissipation of the heat generated within the windings of the rotor assembly has been a constant concern due to the effective insulation, in the thermal sense, of that component from the heat sink represented by the atmosphere surrounding the motor. In the discussion below of the principles of the invention, such devices will be commonly referred to as motors; the term is intended to include analogous machines employed as generators, stepping motors, rotating relays, and their like.

The principal reliance of the prior art has been on the provision of means for improving convective heat transfer from the rotor, generally by means of forced gas flow in the airgap between the rotor and the stator. Atmospheric air is generally employed as the heat transfer medium, and a fan mounted coaxially with the rotor on the motor shaft as the means for forcing the fluid through the airgap.

The reliance of the prior art on convective heat transfer has resulted in manifold problems, because the need to provide relatively large airgaps for coolant passage conflicts with the need to reduce the dimension of that airgap so as to increase the magnetic coupling efficiency between the stationary and rotating magnetic fields of the machine. To compromise such conflicting requirements in certain high-grade applications, such as large generators, the prior art has employed a fluid of relatively low viscosity and high specific heat—typically helium or hydrogen—to act as the coolant, with a secondary heat exchanger for the transfer of the removed heat to the atmosphere.

Such methods and techniques of the prior art are obviated and improved in the electric motor of the invention, wherein heat transfer between the rotor and the stator is principally by means of radiative exchange, such exchange being enhanced by the provision of suitable coatings on the opposing surfaces of these components. Since radiative heat transfer is insensitive to the distance between the emitter and the receptor, and may be improved by the reduction in the mass of air in the radiation path, the method of the invention is fully compatible with an improvement in the magnetic coupling between the stator and the rotor.

SUMMARY OF THE INVENTION

It is, therefore, a primary object of the invention to teach the application of thermally emitting and absorbing coatings to the outer surface of the rotor and the inner surface of the stator, respectively.

It is an object of the invention to teach the construction of improved rotating electrical machines with enhanced radiative heat transfer from the rotor to the stator thereof.

The above objects and advantages of the invention are attained in a rotating electrical machine of conventional construction and type, including motors, generators, and other devices with wound or permanent magnet fields designed for direct current or alternating current service for continuous or intermittent duty, wherein the outer surface of the rotor is coated with a material of higher thermal emissivity than the underlying rotor surface in a temperature range of the order of about 75° C.–150° C., and the inner surface of the stator, opposite the aforementioned outer surface of the rotor, is coated with a material having both higher thermal emissivity and absorptivity than the underlying stator surface in the same temperature range.

Such coatings may be produced by chemical conversion such as anodizing or chemically-induced oxidation of the surfaces, application of covering surfaces such as pigmented plastics, precipitation or depositing of pigments such as metallic oxides on the surfaces by techniques such as use of plasma torch or sputtering or, in the preferred embodiment of the invention, by the application of a thin layer of pigment in a pigment carrier such as pigmented lacquer or paint with the desired optical properties attained by the choice of the pigments.

However the invention is not limited to any particular identity of coating material or method of its application, it being necessary for sufficient effectiveness only that the combination of coatings employed on the inner surface of the stator and outer surface of the rotor, in the aforementioned operating temperature ranges of the surfaces, result in an effective emissivity between such surfaces of at least about 0.65, and preferably at least about 0.8, for best results, and that the absorptivity of the coating employed on the stator be at least about 0.65, and preferably at least about 0.8 for best results. In contrast, the absorptivity of the coating on the rotor may be either high or low because such absorptivity pertains only to heat reflected from the stator, which is minimal if the absorptivity of the stator coating is relatively high. However the absorptivity of the rotor coating is preferably low for optimum results.

As used herein, the expression "effective emissivity" between the rotor and stator surfaces is the emissivity value resulting from the combination of the emissivities of the two surfaces which determines the net radiative heat transfer Q per unit area between them. For example, the usual convenient formula for expressing such heat transfer between concentric gray body cylinders of radii $r_1$ and $r_2$ with $r_1$ less than $r_2$ is:

$$Q = \frac{e_1 e_2}{e_2 + e_1(1 - e_2)(r_1/r_2)} \sigma (T_1^4 - T_2^4)$$

where:
  $e_1$ is the emissivity of the outer surface of the inner cylinder $e_2$ is the emissivity of the inner surface of the outer cylinder $\sigma$ is the Stefan-Boltzmann constant $T_1$ is the temperature of the outer surface of the inner cylinder $T_2$ is the temperature of the inner surface of the outer cylinder The factor in the above formula representing the effective emissivity between the respective surfaces is:

$$\frac{e_1 e_2}{e_2 + e_1(1 - e_2)}$$

DESCRIPTION OF THE PREFERRED EMBODIMENT

Figure 1:
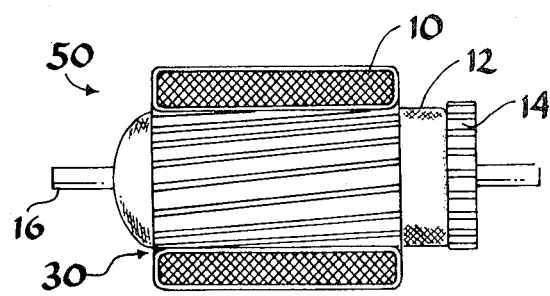
FIG. 1 is a longitudinal, partially sectional view through a typical rotating electrical machine of conventional construction.

FIG. 1 illustrates a conventional rotating electric machine indicated generally as 50 in which a substantially cylindrical rotor 12 is journalled on bearings supporting shaft 16 and rotates inside a concentric stator 10. The rotor 12 is of the wound-coil type and is provided with commutator 14 for the transfer of electric current from stationary brushes into the magnet coils of the rotor.

The electric machine 50 is constructed according to principles well-known in the prior art, and the cooling of the rotor windings is primarily achieved through the circulation of air in an airgap 30 separating the opposite surfaces of the rotor 12 and the stator 10. The airflow may be aided by a suitable circulator, not shown for the sake of clarity of illustration, which may be integrally mounted on shaft 16 or be external to the machine 50 and provided with its own prime mover.

Because of the need for good magnetic coupling between the stator and rotor magnetic fields, the airgap 30 is kept to the smallest dimension commensurate with manufacturing tolerances and, consequently, the cooling capacity of the convective heat removal system is severely limited. This, in turn, necessitates some design compromises: the reduction of the power density in the machine, equivalent to enlarging the device for a given rating; an increase in the airgap to permit greater coolant flow, reducing the operating efficiency of the machine; the increase in the power expended in the air-moving fan or compressor, so as to increase velocities and hence heat transfer coefficients; or the utilization of machine elements capable of operating at higher mean temperatures. All of these compromises are of limited effectiveness. For example, the operating temperature of insulating materials used in the magnet coils of the rotor cannot be increased materially. The most common insulating materials, known in the art as Class "A", have the ability to withstand temperatures in the range between 90° C. and 100° C.; the next group of such materials, known as Class "B" only extend this range by about 20° C. and cost substantially more.

Figure 2:
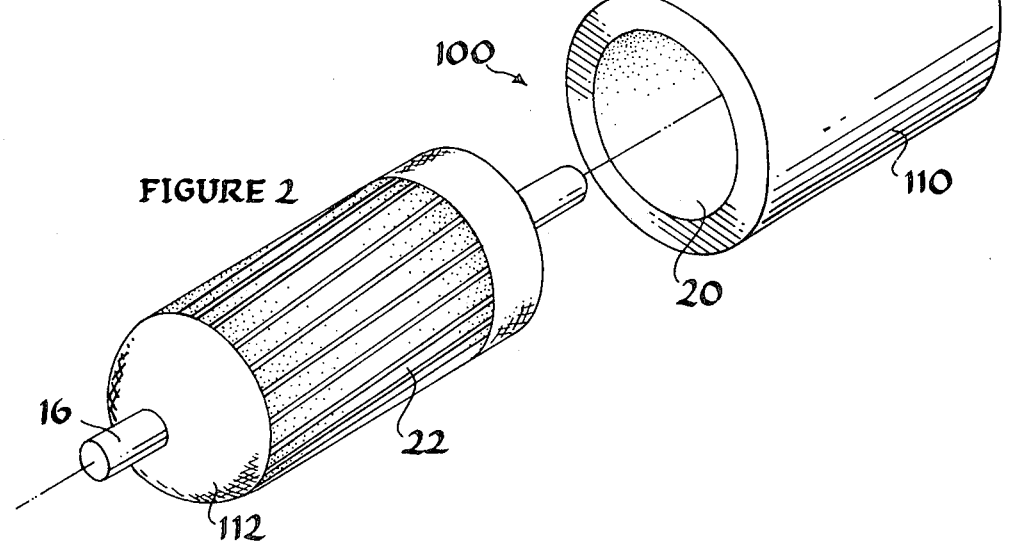
FIG. 2 is an exploded perspective view of a rotating electrical machine of the invention, provided with thermally active coatings on the stator and rotor surfaces thereof.

The exploded perspective view of FIG. 2 shows an electric machine indicated generally as 100 with stator 110 and rotor 112. These components of the machine 100 are in all constructional respects identical to corresponding components of the machine 50, except for the provision of a coating 20 on the inner surface of the stator and of a coating 22 on the outer surface of the rotor 112. These coatings are applied and selected in accord with the principles of the invention and serve to enhance the radiative heat exchange between the rotor and the stator.

Radiant heat transfer occurs automatically in all rotating electrical machines, as does a certain amount of conductive heat loss to the atmosphere through the motor shafts and journals. These mechanisms, in machines of normal constructions as employed in the prior art, contribute only negligibly to the cooling of the rotor, since the surfaces involved in the radiative exchange are poor emitters and absorbers of radiation at the wavelengths corresponding to the absolute temperatures of those surfaces.

For these reasons radiative heat exchange is not considered in the design of rotating electric machinery, and reliance is placed entirely on the convective heat transfer mechanism discussed above. It is the principal, and hitherto unsuspected, discovery of the invention that by the careful selection of coatings 20 and 22 the radiative heat transmission from the rotor to the stator can be improved to a material extent and may become the chief mechanism for the escape of heat from the electric machine.

Figure 3:
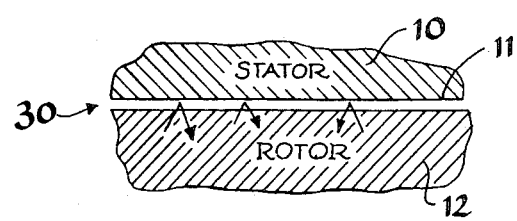
FIG. 3 is a fragmentary, simplified transverse section of a modified version of the electric motor of FIG. 1, employing a plated stator surface in accordance with the prior art.
Figure 4:
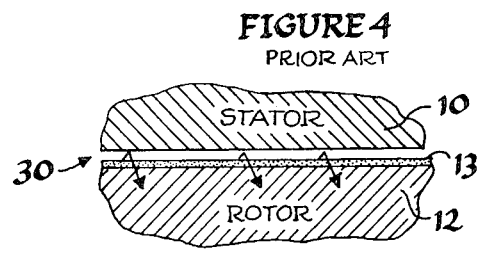
FIG. 4 is a fragmentary, simplified transverse section through another modified version of the electric motor of FIG. 1, employing an insulating varnish coat on the rotor surface in accordance with the prior art.

The application of coatings and surface treatments, as such, is known in the prior art, as indicated in the fragmentary longitudinal cross-sections represented in FIGS. 3 and 4 which show modifications of the prior art machine of FIG. 1. The illustration of FIG. 3 shows the stator 10 plated with a metallic layer 11. Such plating is frequently applied in electric machines in which the stator is formed with a permanent magnet material, as well as in some other instances. The nature of such plated coatings is usually selected to provide protection from corrosion, so that the coating will provide a specular surface of high reflectivity. In any event, due to the inherent nature of metallic coatings, the reflectivity of the surface presented by a plated layer 11 will be very high and it will tend to suppress radiative heat transfer.

Similarly, the mechanism shown in FIG. 4 is common in the prior art and entails the surface coating of the rotor windings with an insulating resin or varnish 13. Such resins, lacquers or varnishes are normally applied in a clear, unpigmented state, since their function of electrical insulation might be affected by the inclusion of some pigments, and present a barrier to radiant heat transmission.

Figure 5:
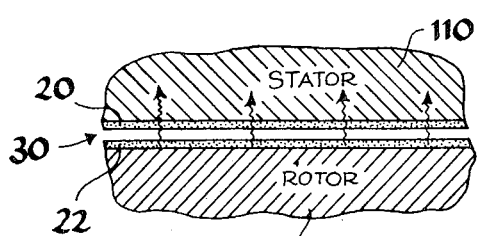
FIG. 5 is a fragmentary transverse section through the electric machine of FIG. 2, employing thermally active, coacting coatings on both rotor and stator surfaces.

The present invention, as illustrated in FIG. 2 and in the fragmentary longitudinal section of FIG. 5, does, on the other hand, employ coatings 20 and 22 specifically selected to enhance thermal radiation heat exchange. Such coatings may be applied over the bare stator and rotor surfaces, respectively, or may be deposited over coatings serving other purposes, such as plating 11 or varnish 13.

The selection of the specific coatings serves to maximize the net heat exchange between the rotor and stator. The latter is always the colder component, being exposed to atmospheric conditions on its outer surface and cooled by convection and radiation. In fact, in accordance with the present invention, it is preferable to connect the stator in a thermally conductive manner to an external heat sink to minimize its temperature by maximizing the conductive transfer of heat therefrom to the sink and thereby also maximize the radiative transfer of heat from the rotor to the stator.

The achievement of the objectives of effective radiative heat transfer from the rotor to the stator, in accordance with the present invention, requires that the outer surface of the rotor be coated with a material of relatively high thermal emissivity in a temperature range of the order of about 75° C.–150° C. of interest in the design and manufacture of electric rotating machinery. The inner surface of the stator must be coated with a material having both a relatively high emissivity and a high absorptivity in the same approximate operating temperature range. While it is preferable that the absorptivity of the coating on the rotor be relatively low, such absorptivity may alternatively be high without having a critically adverse effect on the radiative heat transfer because the absorptivity of the rotor pertains only to heat reflected from the stator which is minimal if the absorptivity of the stator coating is relatively high. Thus, it is within the scope of the present invention to apply coatings on both the rotor and stator which have both high emissivities and high absorptivities and which therefore may, if desired or convenient, constitute identical coatings of the same material having a high emissivity and high absorptivity. Alternatively the coatings may be of different materials both having high, but different, emissivities and absorptivities. Preferably however the coatings are of different materials, both having high emissivities but with only the stator coating having a high absorptivity while the rotor coating has a low absorptivity.

The necessary high emissivities of the coatings of the two surfaces can be quantitatively expressed only in terms of their combination, i.e. in terms of an effective emissivity as defined above. The effective emissivity of the two coatings should be at least about 0.65. This allows for a wide range of individual emissivities of the respective surfaces. For example a rotor surface emissivity of 1.0 and a stator surface emissivity 0.65 would yield an effective emissivity of 0.65 according to the idealized formula set forth previously. Conversely, if both surfaces had an emissivity of 0.8, the effective emissivity according to such formula would be 0.66 and would therefore also be within the range contemplated by the present invention. Preferably, for optimum results, both emissivities would be about 0.90 or above, yielding an effective emissivity of at least about 0.8. The absorptivity of the coating employed on the stator should be at least about 0.65, and preferably at least about 0.8 for best results.

The most preferable coating type satisfying the requirements of the invention is a dispersion of carbon black, or soot, in finely divided form in a lacquer or other suitable pigment carrier. Matte black lacquers containing this or equivalent opacifiers have generally been observed to have emissivities and corresponding absorptivities, in excess of 0.95, generally of the order of 0.97. Such coating would be an excellent one, particularly for the stator, and could also be used for the rotor if dictated by convenience or ecomony. However, because such material has a high absorptivity, a more preferable coating for the rotor would be a white coating of high emissivity and low absorptivity such as a magnesia or alumina pigment. For example a magnesia pigment has an emissivity on the order of 0.95 and an absorptivity on the order of only 0.14.

The materials which are adapted to serve as coatings for purposes of the present invention may be generally categorized as:

1. pigments in pigment carriers, such as paints, varnishes, lacquers, silicone paint bases and water glass;

2. contact pigments with or without pigment carriers, such as the oxides of metallic elements which would be classified as refractories in the solid form and could, in the absence of pigment carriers be precipitated or deposited on the surfaces by techniques such as use of plasma torch, sputtering or bonding;

3. covering surfaces such as pigmented plastics; and 4. chemical conversion coatings produced by techniques such as anodizing or chemically-induced oxidation of the surfaces.

The following is a nonexhaustive list of materials considered to be suitable for surface coatings for purposes of the present invention. All of the listed materials have high emissivities and adequate resistance to temperature in the range of the order of about 75° C.–150° C. Some of the materials have high absorptivities in such temperature range and are indicated as being suitable as a coating for either the rotor or stator or both. Other materials have low absorptivities in such temperature range, and are therefore indicated as being suitable only as coatings for the rotor.

| Materials | Suitable for Rotor and Stator | Suitable for Rotor Only |
|---|---|---|
| Pigments in Pigment Carriers | | |
| Gray silicone paint | X | |
| White silicone paint (gloss) | | X |
| White enamel on iron | | X |
| White lead (basic carbonate) | | X |
| Red lead paint | X | |
| Black gloss paint | X | |
| Varnish, dark glossy | X | |
| Black matte lacquer | X | |
| Black lacquer | X | |
| White lacquer | | X |
| Contact Pigments | | |
| Acetylene soot | X | |
| Camphor soot | X | |
| Lampblack | X | |
| Candle soot | X | |
| Platinum black | X | |
| Red ferric oxide | X | |
| Green chromium oxide | X | |
| White alumina | | X |
| White magnesia | | X |
| Zinc oxide | | X |

| Materials | Suitable for Rotor and Stator | Suitable for Rotor Only |
|---|---|---|
| Titanium oxide | | X |
| Uranium dioxide | X | |
| Covering Surfaces | | |
| Black polyurethane | X | |
| Rubber, gray, soft, rough | X | |
| Hard rubber | X | |

Figure 6:
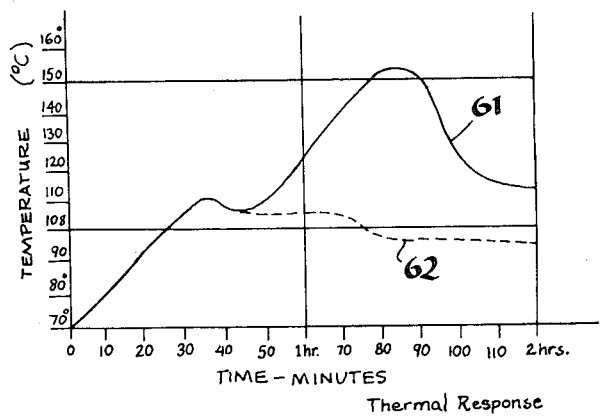
FIG. 6 is a graphical representation of the temperature-time relationship observed on an unmodified electric motor of the prior art, and a similar plot of temperature variation with time of the same motor upon modification with thermally active coatings of the invention.

FIG. 6 is a plot of experimentally determined rotor winding temperatures, measured by reference to the observed resistance of these windings in service to the flow of electric current and the known calibration of the circuit in terms of temperature effects, of identical electric motors operated under identical test conditions, with one of these motors modified through the application of flat black lacquer coatings to the outer surface of the rotor and the inner surface of the stator. Graph 61 plots the temperature history of the unmodified motor with time; the corresponding curve 62 plots the temperature/time history of the motor modified in accordance with the teachings of the invention.

It is evident from FIG. 6 that during the initial warm-up of the two motors the graphs 61 and 62 coincide. The plots indicate a slight overshoot at the 35 minute time mark; this is a result of the method of measurement and represents a transient condition. Beyond 40 minutes the graphs separate and the temperature of the unmodified motor, relying entirely on convective heat transfer, rises rapidly until it reaches a mean value of 155° C. some 85 minutes after start-up. The motor provided with coatings for the enhancement of radiative heat transfer, as shown by graph 62, never exceeds an operating temperature of 115° C. and, at the 85 minute mark, has attained its steady-state operating temperature of approximately 95° C. The unmodified motor does not reach steady-state conditions until almost two hours have elapsed and stabilizes at a mean temperature of approximately 115° C.

The very substantial difference in operating temperature, particularly pronounced during the second hour of operation and thereafter, represents a major difference in the reliability and cost of a particular electric machine. In the example presented the rotor of the motor tested with the coatings of the invention could be produced with Class "A" insulation, whereas the unmodified motor would have to be produced with Class "B" insulation for the same operating conditions.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A rotary electrical machine having a cylindrical rotor and a stator encompassing said rotor, said rotor having an outer surface and said stator having an inner surface opposing said outer surface of said rotor, each of said surfaces having a respective coating thereon having a higher emissivity for thermal radiation than the emissivity of the respective surface of said rotor or stator which underlies the respective coating, the respective emissivities for thermal radiation of said coatings being such that the effective emissivity for thermal radiation between said coatings is at least about 0.65 in a temperature range for said coatings of about 75° C.-150° C., the absorptivity for thermal radiation of the coating on the inner surface of said stator being greater than the absorptivity of said inner surface of said stator and being at least about 0.65 in said temperature range.

2. The rotary electrical machine of claim 1 wherein the effective emissivity for thermal radiation between said respective coatings is at least about 0.8.

3. The rotary electrical machine of claim 1 wherein the absorptivity for thermal radiation of the coating on said outer surface of said rotor is less than the absorptivity of the coating on said inner surface of said stator.

4. The rotary electrical machine of claim 1 wherein the respective emissivities of said respective coatings are equal to each other, and the respective absorptivities of said respective coatings are equal to each other.

5. The rotary electrical machinery of claim 1 wherein at least one of said coatings is composed of pigments.

6. The rotary electrical machinery of claim 1 wherein both of said coatings are composed of pigments.

* * * * *